A. CHAMBERS.
AUTOMOBILE DRIVING MITTEN.
APPLICATION FILED JUNE 27, 1916.

1,302,766.

Patented May 6, 1919.

Adam Chambers, Inventor
By his Attorney Wm. J. Dolan.

UNITED STATES PATENT OFFICE.

ADAM CHAMBERS, OF NEW YORK, N. Y.

AUTOMOBILE DRIVING-MITTEN.

1,302,766. Specification of Letters Patent. Patented May 6, 1919.

Application filed June 27, 1916. Serial No. 106,112.

*To all whom it may concern:*

Be it known that I, ADAM CHAMBERS, a citizen of the United States, and a resident of New York city, Bronx county, and State of New York, have made certain new and useful Improvements in Automobile Driving-Mittens, of which the following is a specification.

The invention relates to devices for protecting the hands of operators of motor vehicles and the like, when exposed to inclement weather.

Objects of the invention are to provide a device of the character referred to which shall be simple, inexpensive, and neat in appearance which may be instantly attached to or removed from the apparatus with which it is employed; which shall be capable of adjustment to fit various sizes of apparatus; which shall consist of few parts; and which shall be efficient in operation and durable in construction.

These and other objects of the invention will in part be obvious and in part be more fully explained in the following description.

The invention consists in the novel parts, improvements, combinations, and features of construction herein shown and described.

The accompanying drawings which are referred to herein and form a part hereof, illustrate one embodiment of the invention, the same serving in connection with the description herein to explain the principles of the invention.

A device for protecting the hands of operators of motor vehicles and the like, constructed in accordance with one feature of the invention, comprises a pair of protective hoods to inclose the operator's hands, and means whereby said hoods may be suitably supported in operative relation to the steering wheel, said means being constructed and arranged to permit the hoods to follow the movements of the operator's hands with or independently of the movement of the steering wheel.

According to another feature of the invention, said means are constructed to allow the hoods to be moved conjointly or independently of each other to follow the movements of the operator's hands; and according to yet another feature of the invention, said means are constructed to permit the hoods to be moved conjointly or relatively to each other to follow the movements of the operator's hands.

Figure 1:
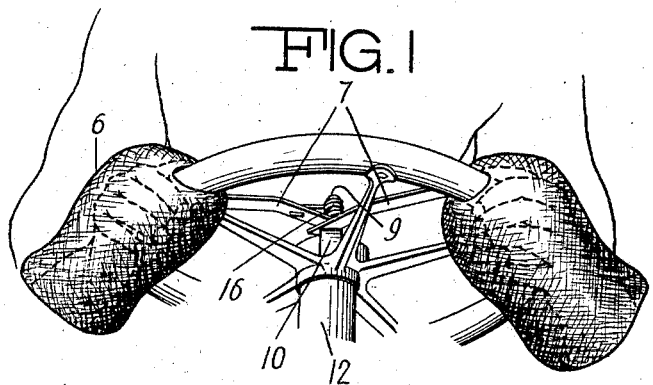
Figure 1 is a perspective view of part of the steering mechanism of a motor vehicle, and of a pair of protective hoods or coverings for the hands of the operator thereof, attached to said steering mechanism, and made in accordance with certain feature of the invention.
Figure 2:
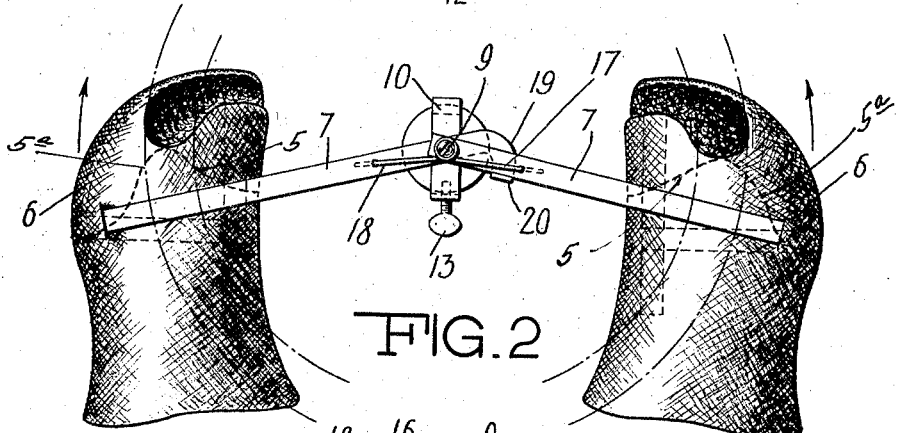
Fig. 2 is a plan view of a pair of protective hoods, constructed in accordance with the invention, and showing their connecting parts and the means for attaching them to the steering wheel of a motor vehicle.

Referring now in detail to the drawings, the embodiment of the invention illustrated comprises a pair of protective hoods 6, for the hands of the operator of a motor vehicle which hoods may be made of any suitable size, shape and material. As shown, they are made in a shape roughly resembling that of a magnified mitten, the mitten in its forward part being constructed to form an orifice through which the rim of the wheel may pass, and the portions of the mitten on opposite sides of the orifice forming receptacles in which are respectively housed the thumb and fingers of the operator, as usually disposed on the rim of the wheel. In Fig. 2 the said receptacle for the thumb is indicated by the dotted line 5; and the receptacle for the fingers by the dotted line $5^a$. It will be seen that the thumb and fingers can move in and out of said receptacles with the utmost freedom to manipulate the throttle and spark. The hood will preferably be made of material waterproof on its exposed surface, and have a lining adapted to keep warm the hand of the operator.

Suitable means are provided for supporting the hoods in operative relation to the steering wheel, and, preferably, and as shown, said means comprises a pair of radial arms 7, which at their outer ends terminate each in a framework 8 suitable for mounting the hood. At its inner end each arm 7 is pivotally mounted upon a bolt 9 which is engaged by a yoke 10, and said yoke has on one side an inwardly extending flange 11 adapted to engage the head of the steering rod 12 and on its other side is formed with a recess through which extends a set screw 13 by means of which the yoke may be quickly attached to or disengaged from said rod 12.

Figure 3:
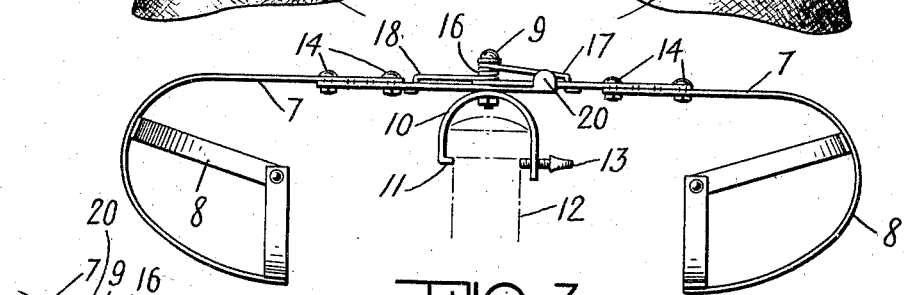
Fig. 3 is a side view of a framework, made in accordance with certain features of the invention, upon which framework the protective covering is mounted.

In order that the device may be accommodated to fit various sizes of steering wheels and the like, in the preferred embodiment of the invention illustrated each arm 7 is made extensible, see Fig. 3. This is accomplished by making the arm 7 of two parts, each part having formed therein a longitudinal slot. Screw bolts 14 engage the two parts of the arm through the slots, and it will be obvious that by means of the slots and screws the relative longitudinal positions of the parts may be varied and thus the length of the entire arm increased or decreased at will.

In a device of this character the protective hoods should not interfere with the movements of the operator's hands. In the preferred embodiment of the invention, therefore, means are provided to enable the hoods freely to follow the movements of the operator's hands with or independently of the movement of the steering wheel. As shown, a spring 16 is coiled about the bolt 9, being held in place at its lower portion by one of the arms 7 and at the upper portion by the head of said bolt 9. The ends 17, 18 of said spring are engaged by the walls of recesses in the respective arms 7, said ends being suitably fashioned for this purpose, all as clearly shown in Fig. 3. One of said arms 7 has an extension 19 projecting substantially at right angles to the arm and which has an upwardly extending flange or stop 20 which engages with the side of the other arm 7, thus serving to limit the movement of the arms 7 by the spring and thus tending to hold the two arms and their hoods in a normal position, as shown in Figs. 2 and 3. The tension of the spring is suitably regulated.

It will be seen that, by reason of the construction thus described, the arms 7 of the hoods 6 will be free to and will follow the movements of the hands of the operator whether backward or forward, and this without in the slightest degree hampering or interfering with said movements, and upon completion of any particular movement, and when permitted to do so, will automatically return to normal position. It will be seen also that these free movements of the arms 7 may be either conjointly or relatively to each other, or independently of each other.

It will also be noted that when the device is applied to a steering wheel which has a surface not in a horizontal plane but at an angle, the spring may be dispensed with, the arms and hoods in such case tending to return to normal position under the influence of gravity.

Figure 4:
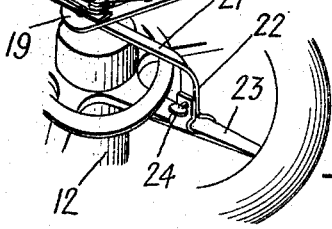
Fig. 4 is a fragmentary perspective view, illustrating a detail.

In some forms of construction of steering wheels it is not convenient to attach the device thus far described to the steering rod in the manner described. A modification is provided for such cases, therefore, which is illustrated in Fig. 4, and in which modification the arms 7 are arranged on a member 21, the lower arm 7 being rigidly secured to said member 21, which has a depending flange 22 located at a suitable distance from the steering rod, said flange being secured to an arm 23 of the wheel by a thumb screw 24.

It will be seen that a protective device of the character described, made in accordance with the invention shown and described, will carry out the objects of the invention as enumerated and will possess other advantages which will be apparent to those skilled in the art.

In its broader aspects the invention is not limited to the precise construction shown and described, as many changes may be made in the details thereof without departing from the main principles of the invention or sacrificing its chief advantages.

I claim:

1. An attachment for automobile steering wheels and the like, comprising a pair of protective hoods to inclose the operator's hands, and a pair of extensible pivoted arms carrying the respective hoods.

2. An attachment for automobile steering wheels and the like, comprising a pair of protective hoods to inclose the operator's hands, a pair of pivoted arms carrying the respective hoods, and a spring tending constantly to maintain the pivoted arms in a normal position with the hoods conveniently disposed at opposite sides of the wheel.

3. An attachment for automobile steering wheels and the like, comprising a pair of protective hoods to inclose the operator's hands, a pair of radial arms carrying the hoods, a suitable support to which the arms are pivotally connected at their inner ends, said support being adapted to be applied at the axis of the wheel, a spring tending constantly to draw the two arms together, and a stop to limit the movement of the arms in a normal position.

4. An attachment for automobile steering wheels and the like, comprising a pair of protective hoods to inclose the operator's hands, a pair of radial arms carrying the hoods, and a suitable support to which the arms are pivotally connected at their inner ends, said support being adapted to be applied at the axis of the wheel, a spring tending constantly to draw the two arms together, and a stop located on one of the arms and arranged to engage the other and serving to limit their movement due to the action of the spring so as to hold the two hoods in a normal position.

5. An attachment for automobile steering wheels and the like, comprising a pair of protective hoods to inclose the operator's hands, and means whereby said hoods may be suitably supported in operative relation to the steering wheel, said means being constructed and arranged to permit the hoods separately to follow the movements of the operator's hands with or independently of the movement of the steering wheel, and a spring tending constantly to maintain said means in a normal position with the hoods conveniently disposed at opposite sides of the wheel.

6. An attachment for automobile steering wheels and the like, comprising a pair of protective hoods to inclose the operator's hands, and means whereby said hoods may be suitably supported in operative relation to the steering wheel, said means being constructed to allow the hoods to be moved conjointly or independently of each other to follow the movements of the operator's hands, and a spring tending constantly to maintain said means in a normal position with the hoods conveniently disposed at opposite sides of the wheel.

7. An attachment for automobile steering wheels and the like, comprising a pair of protective hoods for the operator's hands, each of said hoods having in its forward part a receptacle for the thumb and another receptacle for the fingers of the operator and said receptacles being arranged so that the rim of the wheel may be grasped between them, and means whereby said hoods may be suitably supported in operative relation to the steering wheel, said means being constructed to permit the hoods to be moved conjointly or relatively to each other to follow the movements of the operator's hands, and a spring tending constantly to maintain said means in a normal position with the hoods conveniently disposed at opposite sides of the wheel.

In testimony whereof, I have signed my name to this specification.

ADAM CHAMBERS.

Copies of this patent may be obtained for five cents each, by addressing the "Commissioner of Patents, Washington, D. C."